United States Patent

Wagner et al.

[11] 4,409,078
[45] Oct. 11, 1983

[54] METHODS AND APPARATUS FOR ELECTROSTATICALLY RESOLVING EMULSIONS

[75] Inventors: John P. Wagner, Martinsville; Edward C. Hsu, Bridgewater, both of N.J.

[73] Assignee: Exxon Research and Engineering Co., Florham Park, N.J.

[21] Appl. No.: 255,871

[22] Filed: Apr. 20, 1981

[51] Int. Cl.³ .............................................. B03C 5/00
[52] U.S. Cl. .................................... 204/188; 204/191
[58] Field of Search ............................... 204/188, 191

[56] References Cited

U.S. PATENT DOCUMENTS

| | | | |
|---|---|---|---|
| 3,770,605 | 11/1973 | McCoy | 204/188 |
| 3,794,578 | 2/1974 | Watson | 204/191 |
| 3,839,176 | 10/1974 | McCoy | 204/191 |
| 4,226,689 | 10/1980 | Mayse | 204/188 |
| 4,252,631 | 2/1981 | Hovarongkura | 204/188 |

Primary Examiner—T. M. Tufariello
Attorney, Agent, or Firm—Robert S. Salzman; Joseph J. Dvorak

[57] ABSTRACT

A new apparatus and methods are featured for electrostatically resolving emulsions. The apparatus comprises a flexible electrode carrying electrolytes, therein. Emulsions are resolved by passing current through the electrolyte at frequencies to or above 60 Hz.

6 Claims, 5 Drawing Figures

METHODS AND APPARATUS FOR ELECTROSTATICALLY RESOLVING EMULSIONS

FIELD OF THE INVENTION

This invention relates to methods and apparatus for electrostatically resolving emulsions into their corresponding phases, and more particularly to electrostatic coalescer improvements in which certain difficult emulsions can now be electrostatically resolved for the first time with the utilization of higher current frequencies.

BACKGROUND OF THE INVENTION

Heretofore, certain types of emulsions have been especially difficult to resolve by electrostatic means. These emulsions include: (1) high water content liquid membrane emulsions, (2) crude petroleum tanker and refinery sludges, and (3) oil-continuous emulsions contaminated with electrically conductive catalyst fines.

Another problem with electrostatic coalescer apparatuses is that their current-carrying electrodes often develop pin-hole leaks in the electrode insulation. These leaks result in arcing and general breakdown of the electrode's capability to resolve the emulsions. In addition, many electrodes are comprised of glass or other frangible materials, such that they are easily and often broken.

Emulsions with suspended fines and solids have shown particular difficulty in being resolved, even when alternating current having frequencies in excess of 60 Hz are employed. Such a teaching is given in the United States Patent to L. R. McCoy, U.S. Pat. No. 3,770,605; issued: Nov. 6, 1973.

Also, extreme resolution difficulties have been observed with electrically conductive liquids, even despite the utilization of frequencies as high as 1,000 Hz. For purposes of definition, electrically conductive liquid emulsions are generally in the range of from 0.1 to $1 \times 10^{-10}$ or $1 \times 10^{-12}$ ohm$^{-1}$ cm$^{-1}$.

A teaching of this aforementioned problem is given in the United States patent to L. R. McCoy and L. L. Prem, U.S. Pat. No. 3,839,176; issued: Oct. 1, 1974.

The present invention seeks to resolve the problems set forth above, and in addition, desires to provide other advantages in coalescer methods and apparatus.

The subject invention has successfully treated electrically conductive and solids-containing emulsions at frequencies above 60 Hz. The invention has developed a new, rugged electrode which makes possible improved emulsion-breaking techniques, including dramatic increases in the throughput of the coalescer system.

BRIEF SUMMARY OF THE INVENTION

The invention pertains to methods and apparatus for electrostatically resolving emulsions into their corresponding phases. The methods are generally applicable with emulsions containing solids and with electrically conductive emulsion liquids. Increase in the coalescence apparatus throughput has been achieved. The throughput increases with increasing current frequency at fixed voltage. Methods comprise the steps of:

(a) placing a grounded electrode in an aqueous phase of said emulsion;

(b) placing a current-carrying electrode adjacent an interface of said liquid and solid phases; and (c) passing an alternating current through said current-carrying electrode, said current having a frequency above 60 Hz and a voltage in an approximate range of from 2 to 100 Kv, sufficient to effect the separation of said emulsion into said phases.

The above methods are made possible by an improved electrostatic current-carrying electrode, comprising:

an inner support member for supporting an outer flexible plastic tube, said outer flexible plastic tube surrounding said inner support member and being concentrically spaced therefrom so as to provide a space therebetween, and an electrolyte disposed within said space between said support member and said plastic tube.

It has been found that a preferred current frequency for the electrode is approximately 400 Hz.

The inner support member may be a rod or tube of electrically conducting material, such as a copper or stainless steel.

The outer flexible plastic tube may comprise a nylon, polyethylene, polyvinyl-chloride, or a fluorocarbon plastic, such as Teflon ®.

The electrolyte can be a base, acid or salt which is compatible with the inner support material.

In some cases, a molten salt electrolyte can be used, or one which is a solid at ambient temperatures, but which becomes conducting at elevated temperatures. Such a material can be beta alumina.

It is an object of this invention to provide an improved current-carrying electrode for an electrostatic coalescer system;

It is another object of the invention to provide improved electrostatic resolution of emulsions, particularly certain ones which are especially difficult to resolve;

It is a further object of this invention to provide a method of increasing the throughput of a coalescer system.

These and other objects of this invention will be better understood and will become more apparent with reference to the following detailed description considered in conjunction with the accompanying drawings.

DETAILED DESCRIPTION OF THE INVENTION

Figure 3:
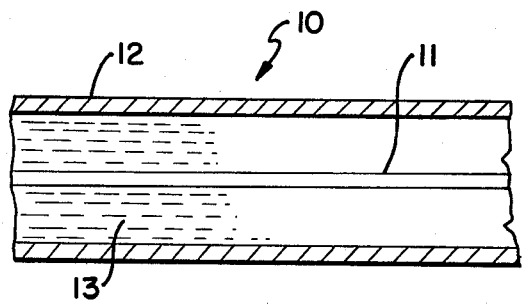
FIG. 3 is a cross-sectional view of the current-carrying electrode shown in FIGS. 1 and 2.

Referring to FIG. 3, the current-carrying electrode 10 of this invention is illustrated in a cross-sectional view. The electrode 10 comprises an inner support member 11, which is generally a rod or tube of conductive material such as a metal (preferably copper or stainless steel). The inner support member 11 is concentrically surrounded by an outer tube 12 of insulative plastic, such as Teflon ®, polyethylene, nylon, polyvinylchloride, etc. The outer tube 12 is spaced from the inner support member 11, which space is filled with an electrolyte 13.

The electrolyte can be any electrolyte which is compatible with the inner support material, i.e, copper or stainless steel. The electrolyte can be an acid, base, salt, molten salt, and a solid that becomes electrically conductive at elevated temperature, such as beta alumina.

Figure 1:
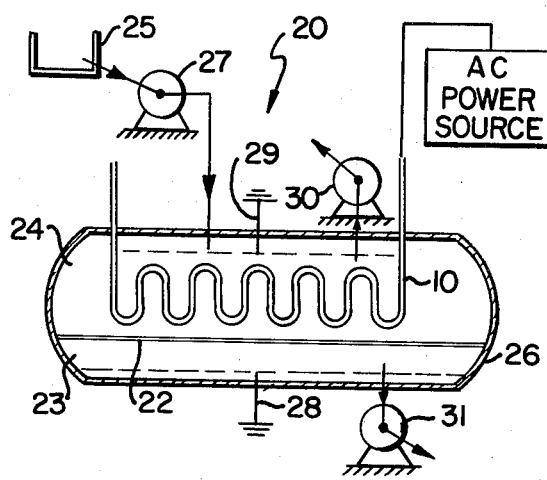
FIG. 1 is a schematic view of a cylindrical coalescer apparatus comprising the improved current-carrying relectrode of this invention.
Figure 2:
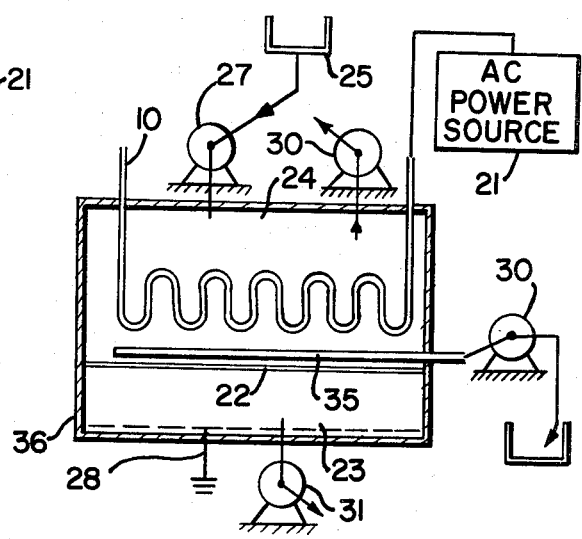
FIG. 2 is a schematic of a rectangular coalescer apparatus comprising the improved current-carrying electrode of this invention.

Referring to FIGS. 1 and 2, common embodiments of coalescer apparatuses are shown, which coalescer apparatuses comprise the inventive electrode of FIG. 3. FIG. 1 depicts a cylindrical coalescer 20 oriented horizontally. The coalescer has its current-carrying electrode 10 connected to an alternating power source 21, which provides current to the electrolyte of electrode 10. The electrode 10 is placed adjacent the interface 22 between the aqueous phase 23 and the non-aqueous phase 24. The distance from the interface 22 may be critical, and the current-carrying electrode 10 is usually placed about one inch therefrom. Maximum electrode/interface spacing is approximately 3 inches.

The emulsion can be stored in a reservoir 25, and pumped into reaction vessel 26 via pump 27.

The coalescer requires that at least one ground electrode 28 be placed in the aqueous phase 23. The coalescer of FIG. 1 also shows a ground electrode 29 disposed in the non-aqueous phase 24. A pump 30 removes the non-aqueous phase from vessel 26, while pump 31 removes the aqueous phase.

FIG. 2 illustrates a rectangular vessel 36 for a common coalescer apparatus. For purposes of brevity, like components will be given the same designations throughout this text.

In the coalescer apparatus of FIG. 2, the emulsion is pumped from reservoir 25 into vessel 36. A perforated distributor pipe 35, which is generally placed approximately 5 mm from the interface 22 for a 3-phase solid-water-oil emulsion containing biwettable solids serves to pump away contaminant solids from the interface 22.

In the coalescer apparatus of FIG. 2, several difficult emulsions were resolved using the inventive methods and apparatus.

The minimum voltage for coalescence at a 1 in. separation should be around 5 kV at 60 Hz to 1500 Hz. At a 2 in. separation the minimum voltage was 7.5 kV at 400 Hz. The preferred voltage was greater than 10 kV with values up to 20 kV considered suitable. Values in excess of 20 kV may be employed at larger separations. The limiting factor on voltage is fixed by the dielectric properties of the insulating plastic tube 12.

Figure 4:
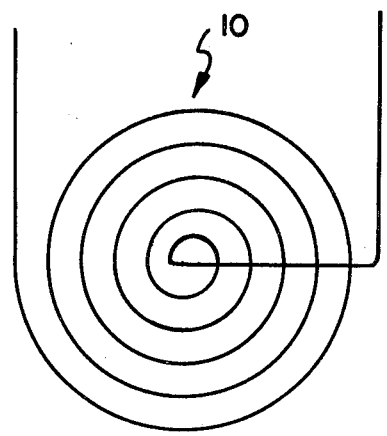
FIG. 4 is a schematic view of the inventive electrode of FIG. 3, featuring a spiral configuration for use in a vertically oriented cylindrical coalescer.

Referring to FIG. 4, the electrode 10 is shown with a spiral configuration. Such a configuration is usefully employed in a vertically-oriented cylindrical coalescer vessel.

All of the electrodes 10 are very durable. This is in contrast to the prior art glass electrodes or glass coated metals which are frangible. Plastic coated metals suffer from state-of-the-art limitations in bonding or adhesion characteristics between coating and substrate. Many of these prior art electrodes develop pin-hole leaks, which results in arcing in the coalescer. The electrode affords ease of fabrication from readily available materials. Plastic tubing, e.g., Nylon, polyethylene, polyvinylchloride, Teflon ®, etc., of thicknesses ranging from a few hundreths of an inch up to around one-eighth of an inch are representative materials useful for insulation. Tubing such as stainless steel or copper is suitable for the internal support.

Operation of the apparatus of FIG. 2 at frequencies of 400 Hz and above leads to significant size and cost reductions over conventional 60 Hz coalescence.

The following examples illustrate the operation of the present invention. Selected feeds include high water content liquid membrane emulsions, crude petroleum and refinery sludges, and an oil continuous emulsion contaminated with conductive catalyst fines.

EXAMPLE 1

The set-up in FIG. 2 was used to coalesce a model liquid membrane emulsion consisting of a 2:1 ratio by volume of membrane (Isopar M) to internal reference (distilled water containing 1 M $H_2SO_4$) stabilized with 1 wt % ECA 4360 from Exxon Chemicals Co.

Figure 5:
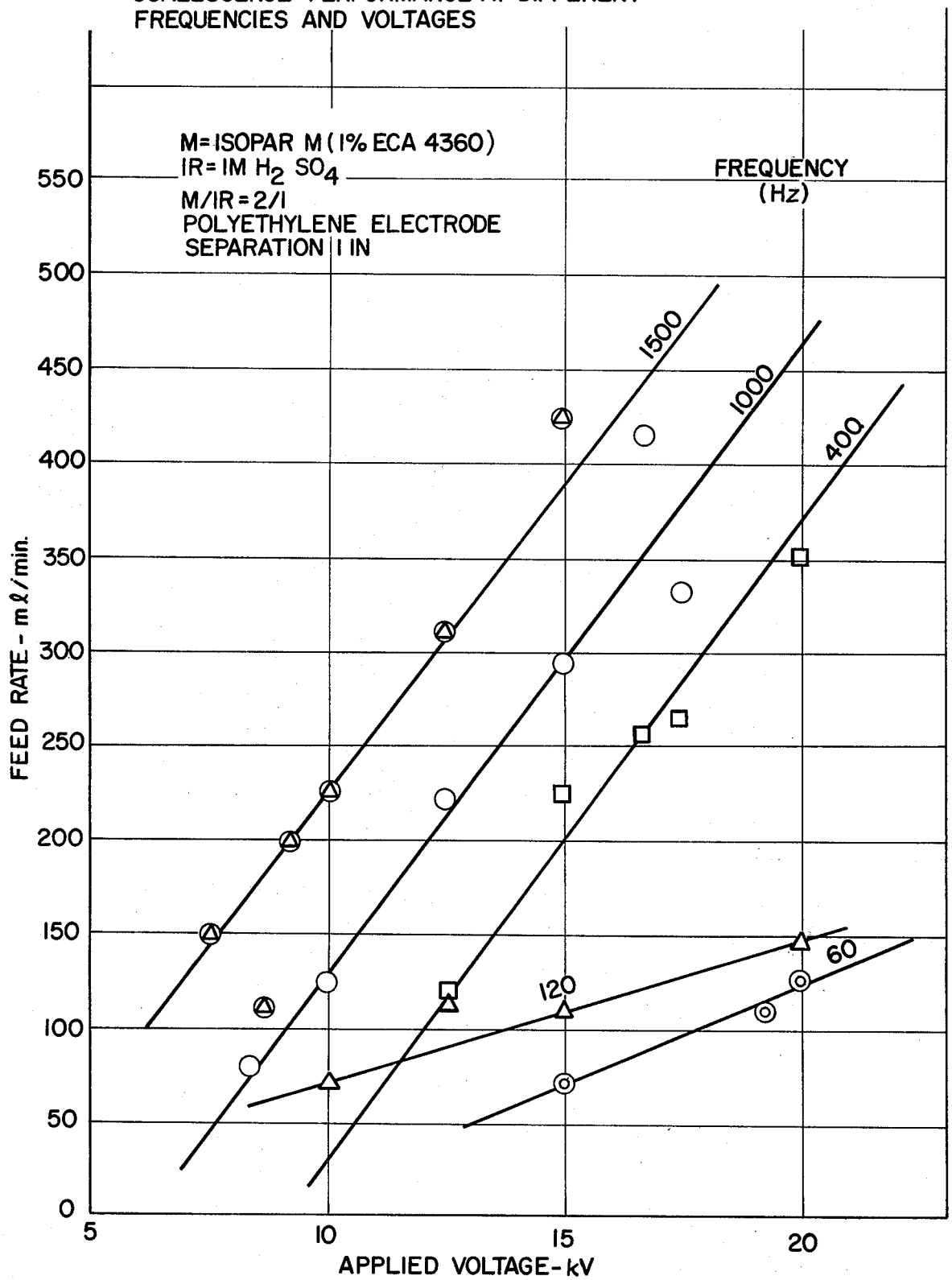
FIG. 5 is a graph of the throughput (flow rate) verses the applied voltage for various frequencies of a coalescer system utilizing the inventive electrode of FIG. 3.

Performance data obtained with the apparatus given in FIG. 2 are given in FIG. 5. The electrode 10 surface area was 183 $cm^2$. It was operated at an electrode spacing to ground of 1 in. Substantial increases in steady-state feed rate, Q, were noted with increasing frequency and applied potential.

At 15 kV and 60 Hz, Q=70 ml/min while at the same potential and 1,000 Hz, Q=295 ml/min. At 1,000 Hz, Q=80 ml/min for V=8.4 kV while Q=295 ml/min at V=15 kV. The electrode 10 coating thickness of the polyethylene 0.125 in. Durability is the most prominent feature that highlights this electrode's usefulness.

Tables 1 and 2 below present a range of performance data for the polyethylene electrode scaled up to a 1 GPM (8.75 b/d) feed (pilot level). The data show that both increased frequency and potential will lower the area required to process a fixed feed. Operation at 400 Hz and above leads to a considerable reduction in electrode area. For example, for the polyethylene electrode 8.3 $ft^2$ of cross-sectional area is required for a 1 GPM feed at 60 Hz and 15 kV. Only 1.5 ft of electrode area is required at 1,500 Hz while 2.9 $ft^2$ is needed at 400 Hz for similar 15 kV potentials. Significant reductions in electrode area achieved at frequencies of 400 Hz and above permit corresponding reductions in coalescer size. Substantial cost savings should result from size reductions.

TABLE 1

SCALE-UP REQUIREMENTS FOR INSULATED ELECTRODES AT 1 GPM FEED RATE

| f (Hz) | Potential (KV) | Flow Rate (ml/min) | Total Surface Area for 1 GPM Feed ($ft^2$) | Cross-Sectional Area for 1 GPM Feed ($ft^2$) | Electrode Type |
|---|---|---|---|---|---|
| 60 | 15 | 70 | 10.6 | 8.3 | Polyethylene Electrode |
| 1,500 | 15 | 388 | 1.9 | 1.5 | Polyethylene Electrode |
| 400 | 15 | 200 | 3.7 | 2.9 | Polyethylene Electrode |

*Polyethylene electrode—183 cm surface area (142 cm cross-sectional area).

TABLE 2

TANK SLUDGES BROKEN WITH INSULATED ELECTRODES

| | Bayway Tank 542 | Esso Languedoc | Baton Rouge Tank 284 |
|---|---|---|---|
| Electrode Type | Polyethylene Teflon | Polyethylene Teflon | Polyethylene Teflon |
| Gradient | 20 | 20 | 20 |

TABLE 2-continued
TANK SLUDGES BROKEN WITH INSULATED ELECTRODES

|  | Bayway Tank 542 | Esso Languedoc | Baton Rouge Tank 284 |
|---|---|---|---|
| (kV/in) |  |  |  |
| Frequency (Hz) | 120,400 | 120 | 400 |

*Tests at ambient and 150° F. for polyethylene and Teflon electrodes.
*Required interfacial pump-off of solids minimized at elevated temperature.

Tests on similar model emulsions were carried out with uninsulated metal electrodes. Violent arcing occurred in all but a few tests for which these emulsions could be broken.

EXAMPLE 2

The apparatus in FIG. 2 containing the polyethylene electrode was used to dehydrate a high water content crude tank sludge—Bayway crude oil tank 542 at ambient temperature. Analysis indicated a water content of 24.8 wt. %, oil 73.5% inorganic solids 1.7%, specific conductivity $7.27 \times 10^{-7} r^{-1}$ cm$^{-1}$, and dielectric constant 957. This sludge was diluted with Isopar "M" to make a 10.1 wt. ration of Isopar/sludge. Test conditions were f=120 Hz and 400 Hz and 20 kV potential at an electrode to interface distance of 1 in. Pump off of interfacial solids was carried out whenever interfacial activity slowed down. Analysis of water content of the raffinate oil according to the Dean and Stark test indicated no measureable water.

This sludge could not be broken with an uninsulated metal electrode at a 5 in. electrode separation distance for f=60, 120, 400 1,000 and 1,500 Hz at 10 kV to 20 kV. Moderate arcing was noted at this separation without any evidence of interfacial activity.

EXAMPLE 3

A low water content sludge (ESSO LANGUEDOC) consisting of around 2.2% H$_2$O, 2.5% inorganic solids and 95% oil, specific conductivity $9.35 \times 10^{-10} r^{-1}$ cm$^{-1}$, and dielectric constant 2.5 was tested similar to Example 2. The only difference being dilution with Isopar "M" in a 5:1 ratio. Analysis of water content according to the Dean and Stark test indicated no water content in the raffinate oil.

As with Example 2, similar results occurred with uninsulated electrodes. Violent arcing occurred at 20 kV and f=120 Hz with uninsulated electrodes when a demulsifier Corexit 7651 (0.1 wt. %) was added, and the electrode separation was reduced to around 2.5 in.

EXAMPLE 4

Another example of the present invention consisted of an oil continuous emulsion containing a high percentage of conductive catalyst fines (approximately 48%), 49% oil and around 3% water. The designation of this sludge was Baton Rouge Tank 284. The dielectric constant and specific conductivity of this sludge were 2.6 and $7.29 \times 10^{-10} r^{-1}$ cm$^{-1}$, respectively. Dilution was in a 10:1 Isopar/sludge ration. This feed was run continuously at 400 Hz and 20 kV with the polyethylene electrode 1 in off the interface. The feed rate of 296 ml/min was balanced by an oil flow of 216 ml/min and a solids pump-off rate of 80 ml/min. Dean and Stark type analysis indicated no water in the raffinate oil and the pump-off mixture.

EXAMPLE 5

Testing with a Teflon ® insulated electrode (1/16 in. for tubing 12) was extended to a cell temperature of 150° F. The preceeding three sludges did not exhibit interfacial problems even for solids layers as thick as 5 mm. Pump off requirements are minimized therefore at high temperatures. The Dean and Stark analysis for water for ESSO Languedoc, Bayway Tank 542, and Baton Rouge 284 indicated no water in the raffinate oil.

The present system is limited to the boiling point of water since an aqueous electrolyte serves as the internal contact. A direct extension of this method would require addition of higher boiling point fluids with high specific conductivities. Molten salts and conduiting solids electrolytes are other exemplary extensions.

Having thus described the invention, what is desired to be protected by Letters Patent is presented in the following appended claims.

What is claimed is:

1. A method of electrostatically resolving emulsions containing solids dispersed in liquid into corresponding liquid and solid phases, comprising the steps of:
    (a) placing a grounded electrode in an aqueous phase of said emulsion;
    (b) placing a current-carrying electrode adjacent an interface of said liquid and solid phases, said current-carrying electrode having an inner support member for supporting an outer flexible plastic tube, said outer flexible plastic tube surrounding said inner support member and being concentrically spaced therefrom so as to provide a space therebetween, and an electrolyte disposed within said space between said support member and said plastic tube; and
    (c) passing an alternating current through said current-carrying electrode, said current having a frequency above 60 Hz and a voltage in an approximate range of from 2 to 100 kV, sufficient to effect the separation of said emulsion into said phases.

2. The method of claim 1, wherein said current frequency is approximately 400 Hz.

3. A method of increasing the throughput of a coalescence apparatus which electrostatically resolves emulsions into their corresponding phases, comprising the steps of:
    (a) flowing said emulsion into a reaction vessel;
    (b) placing a grounded electrode in an aqueous phase of said emulsion;
    (c) placing a current-carrying electrode adjacent an interface of said phases, said current-carrying electrode having an inner support member for supporting an outer flexible plastic tube, said outer flexible plastic tube surrounding said inner support member and being concentrically spaced therefrom so as to provide a space therebetween, and an electrolyte disposed within said space between said support member and said plastic tube;
    (d) passing an alternating current through said current-carrying electrode, said current having a frequency above 60 Hz and a voltage in an approximate range of from 2 to 100 kV, sufficient to effect the separation of said emulsion into said phases, said throughput increasing with increasing frequency for a given voltage; and
    (e) removing the separated phases from said reaction vessel.

4. The method of claim 3, wherein said current frequency is approximately 400 Hz.

5. A method of electrostatically resolving an emulsion having an approximate range of electrical conductivity of from 0.1 to $1 \times 10^{-12}$ ohm$^{-1}$ cm$^{-1}$ into its corresponding phases, comprising the steps of:
   (a) placing a grounded electrode in an aqueous phase of said emulsion;
   (b) placing a current-carrying electrode adjacent an interface of said phases, said current-carrying electrode having an inner support member for supporting an outer flexible plastic tube, said outer flexible plastic tube surrounding said inner support member and being concentrically spaced therefrom so as to provide a space therebetween, and an electrolyte disposed within said space between said support member and said plastic tube; and
   (c) passing an alternating current through said current-carrying electrode, said current having a frequency above 60 Hz and a voltage in an approximate range of from 2 to 100 kV, sufficient to effect the separation of said emulsion into said phases.

6. The method of claim 4, wherein said current frequency is approximately 400 Hz.

* * * * *